United States Patent
Saccomanno et al.

(10) Patent No.: US 7,690,814 B2
(45) Date of Patent: Apr. 6, 2010

(54) LUMINAIRE WITH A ONE-SIDED DIFFUSER

(75) Inventors: Robert J. Saccomanno, Montville, NJ (US); Ivan B. Steiner, Ridgewood, NJ (US)

(73) Assignee: Honeywell International Inc., Morristown, NJ (US)

( * ) Notice: Subject to any disclaimer, the term of this patent is extended or adjusted under 35 U.S.C. 154(b) by 783 days.

(21) Appl. No.: 11/076,627

(22) Filed: Mar. 10, 2005

(65) Prior Publication Data

US 2006/0203490 A1  Sep. 14, 2006

(51) Int. Cl.
*F21S 6/00* (2006.01)
*F21V 5/00* (2006.01)
*F21V 7/00* (2006.01)
*F21V 5/02* (2006.01)

(52) U.S. Cl. .................. 362/257; 362/244; 362/246; 362/309; 362/330; 362/331; 362/339

(58) Field of Classification Search .............. 362/257, 362/339, 244, 246, 309, 330, 331
See application file for complete search history.

(56) References Cited

U.S. PATENT DOCUMENTS

| | | | |
|---|---|---|---|
| 659,353 A | 10/1900 | Pitkin | |
| 1,500,185 A | 7/1924 | Gage | |
| 2,050,429 A | 8/1936 | Dorey | |
| 2,101,199 A * | 12/1937 | Rolph | ................. 362/309 |
| 2,258,354 A * | 10/1941 | Doane | ................. 362/224 |
| 2,366,356 A | 1/1945 | Rolph | |
| 3,340,393 A * | 9/1967 | Kurt et al. | ............. 362/309 |
| 3,647,148 A | 3/1972 | Wince | |
| 3,671,101 A | 6/1972 | Finch | |
| 3,712,707 A | 1/1973 | Henkes, Jr. | |
| 3,716,709 A | 2/1973 | Goytisolo Taltavull | |
| 3,988,609 A * | 10/1976 | Lewin | ................. 362/217 |
| 4,260,220 A | 4/1981 | Whitehead | |
| 4,300,185 A * | 11/1981 | Wakamatsu | ............. 362/33 |
| 4,615,579 A | 10/1986 | Whitehead | |
| 4,704,004 A * | 11/1987 | Nosker | ................. 349/67 |
| 4,750,798 A | 6/1988 | Whitehead | |
| 4,787,722 A * | 11/1988 | Claytor | ................. 359/742 |
| 4,900,129 A | 2/1990 | Vanderwerf | |
| 4,911,529 A | 3/1990 | Van De Ven | |
| 5,161,057 A | 11/1992 | Johnson | |
| 5,237,451 A * | 8/1993 | Saxe | ................. 359/565 |
| 5,462,700 A | 10/1995 | Beeson et al. | |

(Continued)

OTHER PUBLICATIONS

DIN 5035 Park I, "Artificial lighting; Terminology and general requirements", Deutsche Norm [German Standard], Jun. 1990. UDC 628.93:628.972:001.4

(Continued)

*Primary Examiner*—Jong-Suk (James) Lee
*Assistant Examiner*—David J Makiya
(74) *Attorney, Agent, or Firm*—Ingrassia Fisher & Lorenz, P.C.

(57) ABSTRACT

A luminaire is provided with a one-sided diffuser, located a predefined distance below the light output ports, in order to efficiently distribute light through an upper smooth surface and a lower surface having light altering tracks where each wherein each light altering tracks distributes its received light over a range of angles within a predefined cutoff angle.

5 Claims, 5 Drawing Sheets

U.S. PATENT DOCUMENTS

| | | | |
|---|---|---|---|
| 5,645,337 A * | 7/1997 | Gleckman | 362/29 |
| 5,771,328 A | 6/1998 | Wortman | |
| 5,799,126 A * | 8/1998 | Nagatani et al. | 385/146 |
| 5,917,664 A | 6/1999 | O'Neill | |
| 5,997,709 A | 12/1999 | Krinke | |
| 6,033,094 A | 3/2000 | Sohn | |
| 6,043,936 A | 3/2000 | Large | |
| 6,244,731 B1 * | 6/2001 | Koiko et al. | 362/297 |
| 6,261,664 B1 | 7/2001 | Beeson et al. | |
| 6,317,263 B1 | 11/2001 | Moshrefzadeh | |
| 6,359,735 B1 | 3/2002 | Gombert | |
| 6,445,509 B1 | 9/2002 | Alden | |
| 6,572,241 B1 * | 6/2003 | Chan et al. | 362/231 |
| 6,827,467 B2 * | 12/2004 | Tenmyo | 362/268 |
| 2003/0156414 A1 * | 8/2003 | Tenmyo | 362/268 |
| 2004/0047162 A1 * | 3/2004 | Saccomanno et al. | 362/558 |
| 2004/0100699 A1 * | 5/2004 | Cowan et al. | 359/599 |

OTHER PUBLICATIONS

DIN 5035 Part 7, "Artificial lighting of interiors; Lighting of rooms with VDU workstations or VDU assisted workplaces", Deutsche Norm [German Standard], Sep. 1988. UDC 628.93:628.977.2:681.327.13.

* cited by examiner

LUMINAIRE WITH A ONE-SIDED DIFFUSER

BACKGROUND OF THE INVENTION

1. Technical Field

This invention relates to the field of illumination systems and more specifically to lighting equipment where it is advantageous to have a minimum amount of light outside a predefined cutoff angle.

2. Background Art

Any discussion of the prior art throughout the specification should in no way be considered as an admission that such prior art is widely known or forms part of common general knowledge in the field.

As is known, a luminaire is a device to produce and distribute light wherein the production of light can comprise artificial or natural light sources. An example of a reduced-glare luminaire is shown in Lewin, U.S. Pat. No. 3,988,609, wherein a plurality of fluorescent lamps are housed in a reflective cavity, and whose output distribution is limited by way of a prismatic film spaced at a distance from the lamps. The film has a smooth side facing the lamps and varying prismatic features on the opposing face. From the perspective of a prismatic feature, light rays can be received from any of the lamps as well as from reflection off the reflective cavity. Further, light rays that travel at near-grazing-incidence to the smooth face of the film are likely to undergo total internal reflection (TIR) once striking the face of a prism (see Whitehead, U.S. Pat. No. 4,262,220). The net effect is that a single prism will see a wide variation of incidence angles, and thereby unable to constrain the light rays within the glare free angular extents, and further would suffer from efficiency losses due to absorption from reflections off the cavity wall and rays that recycle back to the lamp. Thus Lewin, while reducing some glare, still allows glare and also considerably reduces the efficiency of the lamp.

With respect to objectionable glare, standards have been developed to assess a luminaire, such as the Deutsches Institute for Normung (DIN, specification entitled "Artificial Lighting, Terminology and General Requirements", which is now International Standards Organization (ISO) Specification 5035, (herein after referred to as "the DIN Specification"). The DIN Specification requires, among other things, restricting light emanating from a luminaire between 45 and 85 degrees relative to a ceiling normal. It is known that limiting light rays in such a manner will reduce glare in the vicinity of computer screens thereby decreasing eyestrain and fatigue on office workers.

SUMMARY OF THE INVENTION

The luminaire embodiments described below are variations of a luminaire disclosed in our U.S. patent application Ser. No. 10/366,337, entitled "Luminaire Device", filed on Feb. 14, 2003, and published as US Patent Application No. 2004/0047162 A1 on Mar. 11, 2004. An example luminaire configuration, disclosed in this application, comprises a linear tubular fluorescent lamp, a linear array of down-light reflectors whose output is angularly constrained, and a two-sided diffuser situated at a distance below the down-light reflectors that collimate the light to comply with the requirements of the DIN Specification. The two-sided diffuser captures the downward-projected light after it has naturally spread laterally and redistributes the light in compliance with the DIN Specification. This has the net effect of lowering the luminance out of the down-light reflectors by spreading the light over a larger area. Significantly, the luminescence from a luminaire in accordance with our invention is limited to a predefined angular limit referred to herein as a "cutoff angle", which is an angle beyond which the light flux through an exit aperture significantly drops. In this application the diffuser comprises structured features on both an upper surface and a lower surface. In an office environment, lower luminance is less objectionable should one stare directly up at a light fixture within the angles defined by the DIN Specification. The diffuser also precludes a direct-view of the lamp through the down-light reflectors.

In a preferred embodiment of the present invention, a one-sided diffuser is employed, such as a diffuser having a plurality of structured features on its lower surface only. Further, in accordance with our invention, the diffuser is spaced at a distance from the luminaire such that each of the structured features receives rays within a small solid-angle. The structured features are then engineered to distribute the rays over a larger solid-angle, yet still remain, for example, within the DIN Specification. Advantageously, this one sided diffuser can be configured to replace the two-sided diffuser used with various up-light/down-light luminaire embodiments taught in the '337 application. It can also be used with point sources, such as arc lamps or light emitting diodes (LED). In the case of a linear lamp, the structured features run along parallel tracks following the axis of the lamp, and in the case of isolated point sources, the structured features run in arcuate or concentric tracks. While in the preferred embodiment these structured features comprise cylindrical refractive elements, the present invention can be implemented with linear and/or arcuate tracks of other light-altering features such as diffractive elements (similar to those shown in U.S. Pat. No. 6,608,722), gradient indices (similar to those shown in U.S. Pat. No. 5,365,354), holographic elements (similar to those shown in U.S. Pat. No. 6,421,148), micro lenses (similar to those shown in U.S. Pat. No. 6,033,094), or other surface diffusers (such as those shown in U.S. Pat. Nos. 6,261,664 and 5,462,700) and so henceforth the phrase "light altering tracks" will be used.

Further advantages and embodiments of the present invention will become apparent from the following description and drawings.

BRIEF DESCRIPTION OF DRAWINGS

Figure 1:
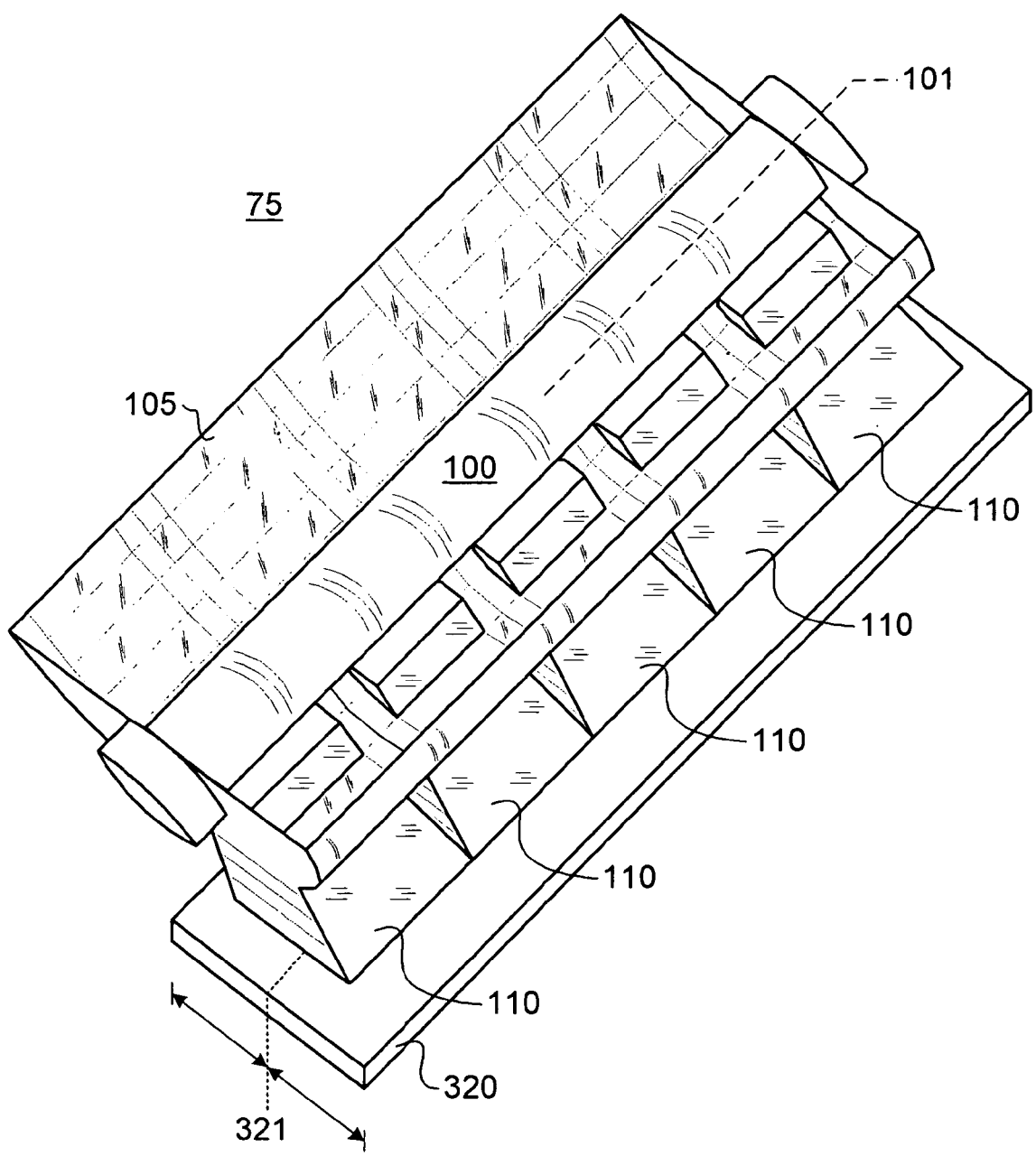

Brief Description of the Several Views of the Drawing

The accompanying figures further illustrate the present invention.

FIG. 1 shows an isometric view of a linear direct/indirect luminaire in combination with a one-sided diffuser according to the present invention.

Figure 2:
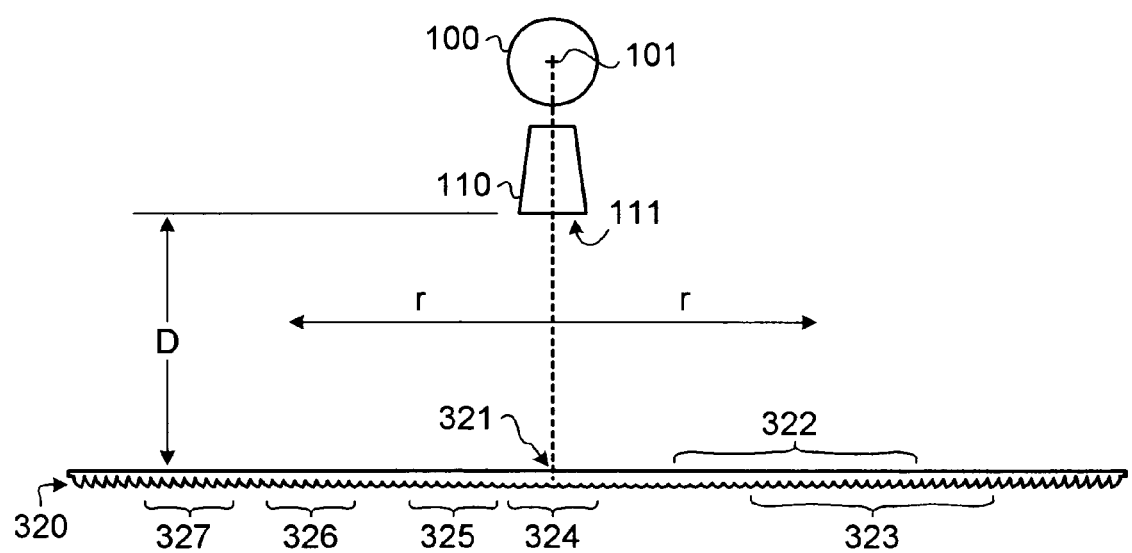

FIG. 2 illustrates a linear one sided-diffuser including linear light altering tracks in accordance with the present invention.

Figure 3:
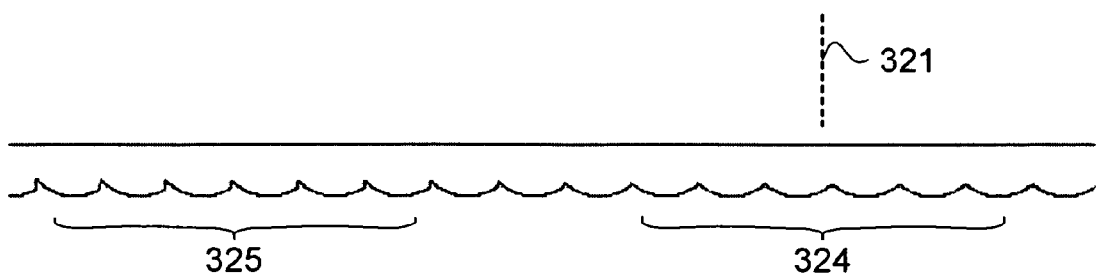

FIG. 3 illustrates further details of the linear light altering tracks shown in FIG. 2.

Figure 4:
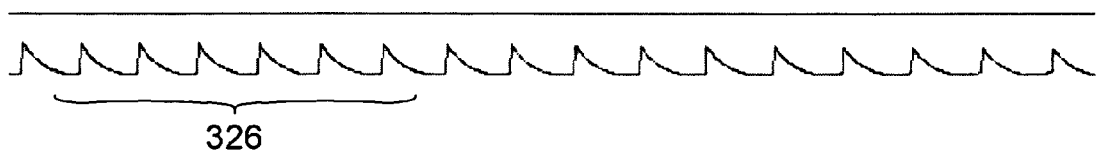

FIG. 4 also illustrates further details of the linear light altering tracks shown in FIG. 2.

Figure 5:
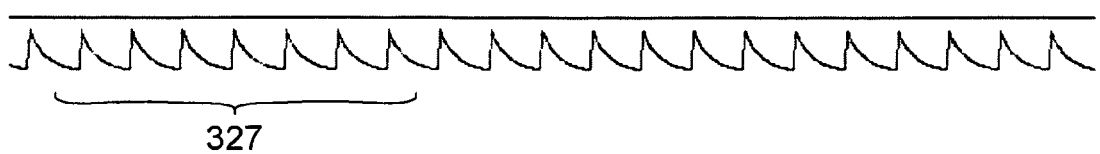

FIG. 5 also illustrates further details of the linear light altering tracks shown in FIG. 2.

Figure 6:
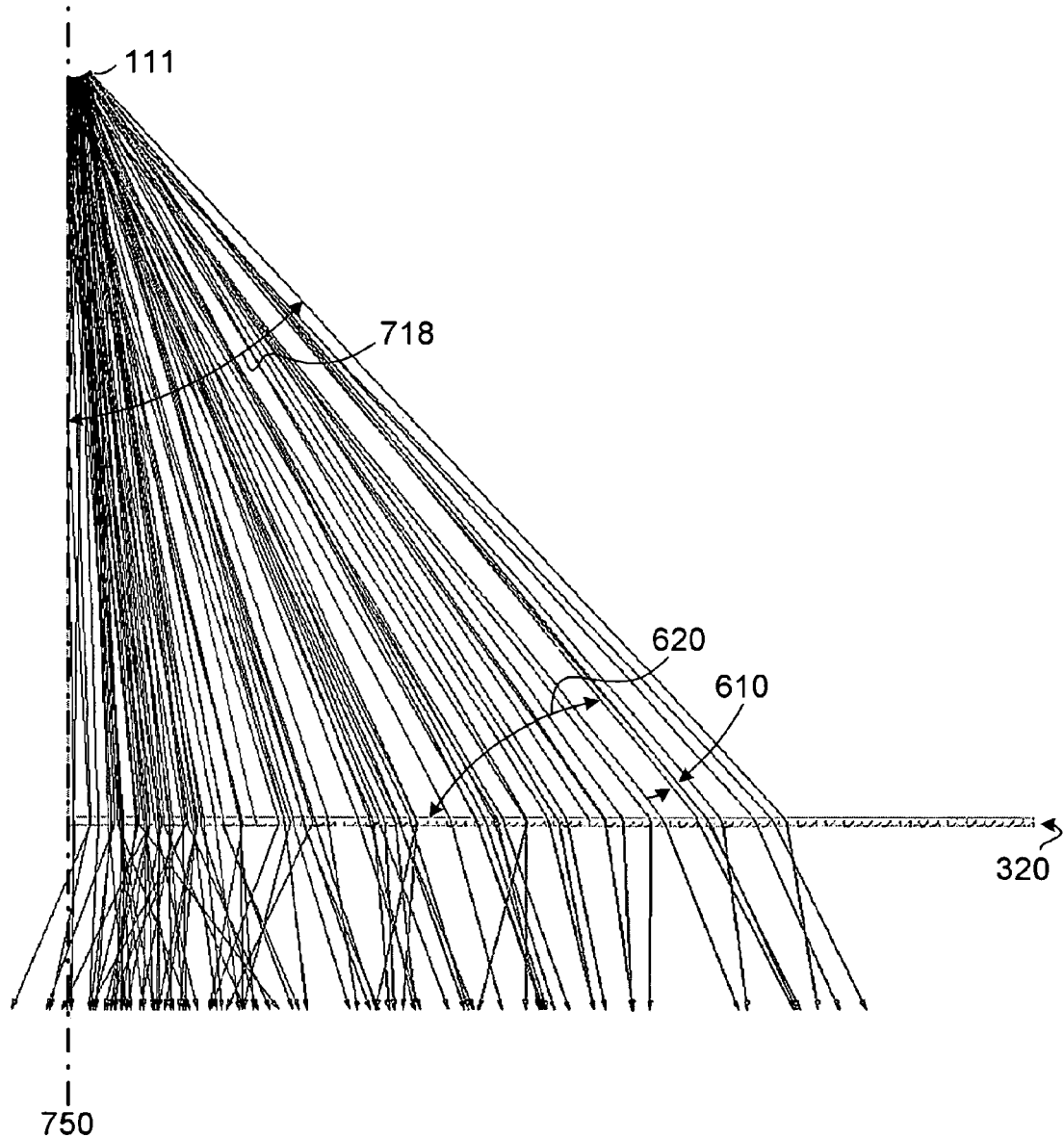

FIG. 6 is an output of a computer model that illustrates the optical performance of one example of the inventive one-sided diffuser.

Figure 7:
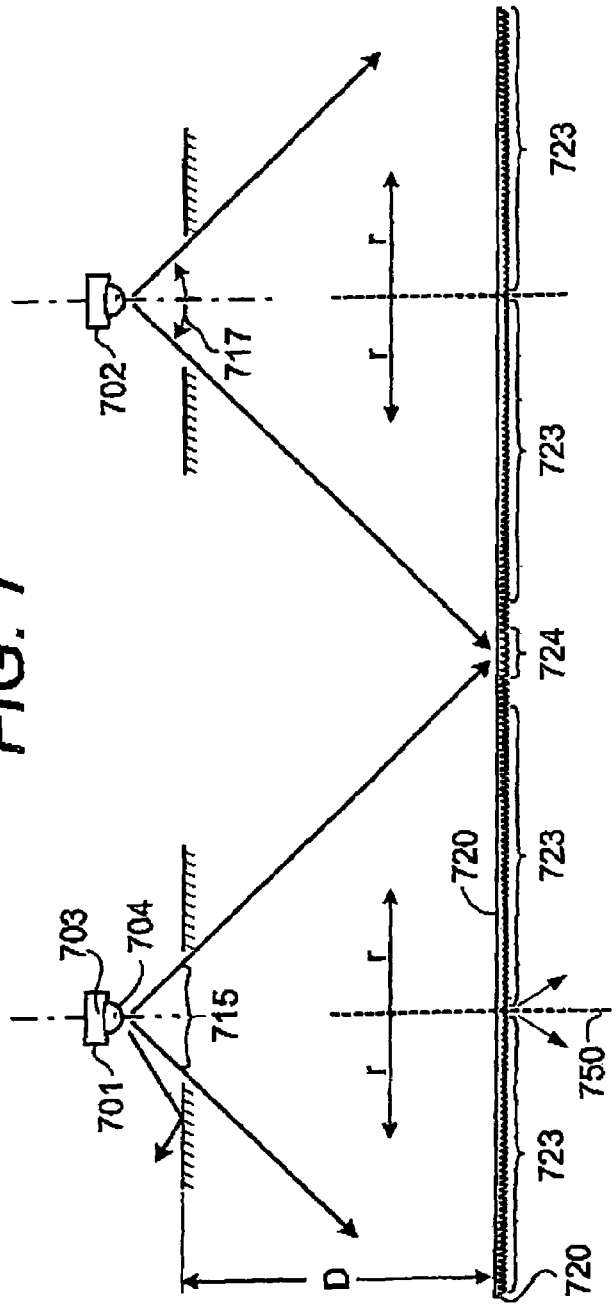

FIG. 7 depicts a further embodiment of the inventive diffuser that includes an optical mixing region between two light sources.

Figure 8:
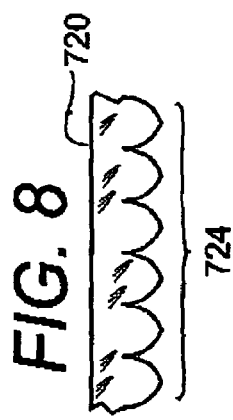

FIG. 8 shows further details of the optical mixing region of FIG. 10.

LIST OF REFERENCE NUMBERS FOR THE MAJOR ELEMENTS IN THE DRAWING

The following is a list of the major elements in the drawings in numerical order.
- 75 linear luminaire (direct/indirect type)
- 100 linear lamp
- 101 central axis (of linear lamp 100)
- 105 curved reflector
- 110 down-light reflector
- 111 output port (of down-light reflector 110)
- 320 one-sided diffuser (with linear light altering tracks)
- 321 centerline (of one-sided diffuser 320)
- 322 upper smooth surface (of one-sided diffuser 320)
- 323 lower surface having varying linear geometric features (of one-sided diffuser 320)
- 610 limited range of solid angles
- 620 unique angle (with reference to diffuser 320)
- 701 first precollimated light source
- 702 second precollimated light source
- 703 LED die
- 704 LED lens element
- 715 aperture
- 720 diffuser (with optical mixing regions)
- 723 light altering tracks (vary according to distance from centerline)
- 724 optical mixing region (between light sources)
- 750 axis normal to diffuser 720
- r varying distance (from diffuser centerline or center)

DETAILED DESCRIPTION OF THE INVENTION

Mode(s) for Carrying Out the Invention

FIG. 1 shows orthogonal views of a linear luminaire 75 of the direct/indirect type. Linear lamp 100 is located within a concave portion of a curved reflector 105 for providing a degree of indirect lighting. Adjacent to and below linear lamp 100 is a linear array of down-light reflectors 110, such as hollow collimators, where each down-light reflector receives light that is not directed upward. The linear array of down-light reflectors 110 is serially arranged to span the length of the linear lamp 100, which may be a common ceiling tubular fluorescent lamp.

In certain embodiments, the linear lamp is a linear array of light emitting diodes (LED) that are collimated (with a one or more of a lens, reflector, and non-imaging optic, as is known in the art) to a solid angle within a reduced-glare or glare-free specification. Note that since the DIN Specification allows for some small amount of light within the glare-producing angles, the LEDs need not have a full cutoff at, say, 45 degrees.

In certain embodiments, the linear array of down-light reflectors 110 will comprise collimating shapes known in the art, such as a compound parabolic concentrator (CPC), or tapered rectangular or triangular hollow collimator array, the latter described in our U.S. Pat. No. 6,428,198. The linear array can be tapered in one axis or both axes, depending upon the divergence of the source and/or the desired degree of diffusion in each axis. Arrays of hollow collimators can be formed from specularly reflecting sheet metal, such as MIRO 2 from Alanod (Round Rock, Tex.).

In certain other embodiments, the linear array of down-light reflectors 110 is an array of solid collimators being composed of a light-transmitting refractive medium, such as a polymer material (e.g. acrylic).

In yet other embodiments, the down-light reflectors can be optical fibers, skylight tubes, or TIR light guides as taught in Whitehead and illuminated by either a collimated point source or, for example, sunlight. The inventive diffuser has the net effect of lowering the luminance out of the luminaire and restricting the angles within a cutoff angle, the latter removing objectionable glare and/or keeping the illuminance at a useable level.

A diffuser 320, having light altering tracks 323 is positioned at a distance D, for example 12 inches (30 centimeters), from the collimating down-light reflectors 110, which distance causes the light altering tracks each to receive a limited solid angle of the light. The centerline of the diffuser 321 is coincident with the central axis 101 of the linear lamp 100. Each down-light reflector 110 includes an output port 111, such as for example a one-inch by one-inch square output (2.5×2.5 centimeter), that directly faces the upper smooth surface 322 of the one-sided diffuser 320.

FIG. 2 depicts a cross-sectional view of a preferred embodiment of the one-sided diffuser 320, which is constructed from a transparent optical material (e.g. acrylics, cyclic olefins, polycarbonates), in accordance with the present invention. The one-sided diffuser has an upper smooth surface 322 and a lower surface having the light altering tracks 323 comprising geometric features that vary with the distance r, from the centerline of the diffuser 321, as indicated by the structured features in regions 324, 325, 326, 327.

The linear light altering tracks 323 may have varying geometric features, as shown by light altering tracks in FIGS. 3, 4, and 5. In a preferred embodiment, these linear light altering tracks are optically refractive in nature and include an alternating series of surfaces-in-shadow (e.g. planar sloped surfaces) and active-surfaces (e.g. cylindrical lens elements) that are oriented with their lengths parallel to both the central axis 101 of the linear lamp 100 and the centerline 321 of the diffuser 322. The planar sloped features connect adjacent cylindrical lens elements in a manner that preserves the overall thinness of diffuser 320, and are designed not to intercept light rays from the down-light reflector 110 shown in FIG. 1, hence "surfaces-in-shadow". In certain embodiments, the geometric features are not continuously variable, but instead are arranged in groups, each group comprising several light altering tracks of identical geometry, in order to facilitate, for example, lower tooling costs. In accordance with our invention, the active-surfaces, such as cylindrical lens elements, of the light altering tracks distribute received light over a range of incidence angles, which are all less than the cutoff angle. The required degree of uniformity across the diffuser observed by a viewer at various angles within the cutoff region will dictate the specific design implementation, some examples of which are shown in the figures.

In other embodiments of our invention, the linear light altering tracks are optically diffractive in nature. As an example, monochrome LEDs can be arranged in an array, wherein the diffractive diffuser for a given LED is designed to accommodate its limited range of wavelengths.

During manufacture of the one-sided diffuser using a plastic molding process, the sloped features can be tilted slightly away from the vertical in order to facilitate mold release as is known in the art; e.g. having a minimum mold release draft angle of about three degrees. Potential manufacturers of our inventive one-sided diffuser include Reflexite (Avon, Conn.), Physical Optics Corp. (Torrance, Calif.), and Wavefront Technology (Paramount, Calif.).

As seen in FIGS. 3 through 5, there are no surfaces-in-shadow in the region 324 about diffuser centerline 321. The surfaces-in-shadow then develop and increase in size as the distance r increases, as indicated in the regions 325, 326, and 327. Note also that while the diffusing surfaces are shown as cylindrical, other forms, both refractive and diffractive/holographic, are contemplated, as long as the majority of the resultant diffusion remains within the cutoff angle.

In addition, certain embodiments may use linear arrays of point light sources, such as light emitting diodes (LED) (e.g. those from Luxeon and Nichia). For these embodiments, certain of the light altering tracks, such as those centrally located between two adjacent point light sources, can be constructed to combine the outermost rays from both of these two sources.

We have verified the operation of our inventive one-sided diffuser by modeling its optical characteristic in a commercially available ray-tracing program ASAP™ from Breault Research Organization Inc., Tucson, Ariz. For example, FIG. 6 shows ray traces of selected light rays emanating from the exit port 111 of a collimating optical element, such as a down light reflector 110, as is shown in FIG. 2 passing through our inventive one-sided diffuser 320. These rays show the effect of the light altering tracks on the individual rays as they pass through the diffuser 320. Specifically, there is a prescribed range of angles 718 exiting output port 111. Each light altering track will receive a limited range of solid angles 610 at a unique angle 620 to the diffuser 320. Each light altering track will spread light over a range of angles as shown in FIG. 6, wherein the maximum angles exiting the diffuser relative to an axis 750 normal to the diffuser are within the cutoff angle, and could emanate from any one of the tracks as dictated by the specific implementation.

Refer now to FIGS. 7 and 8 which illustrate how our one-sided diffuser can be extended to accommodate multiple light sources such as LEDs 701 and 702, each comprising a semiconductor LED die 703 and a corresponding lens element 704. Aperture 715, located a distance D above one-sided diffuser 720, further angularly restrict the diverging beams from the LEDs. The one-sided diffuser 720 includes light-altering tracks 723 that vary according to the distance r from a centerline of a corresponding light source, as described above. In addition to these light altering tracks, the diffuser 720 includes a light mixing region 724 which has optical features, such a cylindrical lens features, which are each configured to intercept and redirect light from both light sources 701 and 702. Extending the diffuser and adding multiple light mixing regions enables accommodation of a large number of individual light sources and helps to minimize the non-uniformity induced by r-squared losses as is known in the art.

One-sided diffusers that use various combinations of linear light altering tracks, circular light altering tracks, and mixing regions will be useful in luminaires that use uncollimated light, include light collimators, or use reflective and non-reflective apertures. Reflective apertures, such as shown in FIG. 7, are also useful in other embodiments of a direct/indirect luminaire using non-collimated LEDs. Non-reflective apertures are useful in controlling the non-useful angles emanating from the LED in a direct luminaire, such as "tails" in the angular distribution of some off-the-shelf LEDs). It is further anticipated that such one-sided diffusers will be modified and refined to comply with future lighting specifications.

Alternate Embodiments

Alternate embodiments may be devised without departing from the spirit or the scope of the invention. For example, the smooth top surface of the diffuser can further comprise various features for aesthetic and other purposes. Also, as is also known in the art, additional features can be added upon the surfaces and/or within the bulk material of the present invention, for example:

U.S. Pat. Nos. 4,911,529 and 5,997,709 (diffusing particles or microlenses)

U.S. Pat. Nos. 5,161,057 and 6,043,936 (diffractive color-affecting features)

U.S. Pat. No. 6,359,735 (moth eye antireflection features)

What is claimed is:

1. A luminaire comprising:
(a) a light source whose light output is constrained within a first predefined glare-restricted angular extent about an axis; and
(b) a transparent optical diffuser spaced at a distance from said light source and having a planar first surface facing said light source and an opposing second surface including a plurality of light altering tracks comprising an alternating series of planar sloped surfaces and cylindrical lens elements, each of the cylindrical lens elements being between and adjacent to two of the planar sloped surfaces, a size of the planar sloped surfaces increasing with distance from a centerline of said diffuser, and a thickness of said diffuser at each of the light altering tracks being substantially uniform,
(i) wherein each light altering track receives a limited first solid-angle of said light by virtue of its distance from the light source, and
(ii) wherein each light altering track distributes its received light over a larger second solid angle within a second predefined glare-restricted angular extent, the second predefined glare-restricted angular extent being smaller than the first predefined glare-restricted angular extent.

2. The luminaire of claim 1 wherein said second predefined glare-restricted angular extent overlaps said first predefined glare-restricted angular extent.

3. The luminaire of claim 1 wherein said light altering tracks include refractive optical elements.

4. The luminaire of claim 1 wherein said light altering tracks include diffractive optical elements.

5. The luminaire of claim 1 wherein at least one of the plurality of light altering tracks receives light from the light source and a second light source.

* * * * *